(12) United States Patent
Clucas et al.

(10) Patent No.: US 8,484,967 B2
(45) Date of Patent: Jul. 16, 2013

(54) SEALED ENGINE/COMPRESSOR HOUSING COMPRISING AN ADSORPTION ELEMENT

(75) Inventors: Donald Murray Clucas, Christchurch (NZ); Reuben Rusk, Christchurch (NZ)

(73) Assignee: Suma Algebraica, S.L., Aretxabaleta (ES)

( * ) Notice: Subject to any disclaimer, the term of this patent is extended or adjusted under 35 U.S.C. 154(b) by 696 days.

(21) Appl. No.: 12/676,482

(22) PCT Filed: Sep. 4, 2008

(86) PCT No.: PCT/NZ2008/000228
§ 371 (c)(1),
(2), (4) Date: Mar. 4, 2010

(87) PCT Pub. No.: WO2009/031908
PCT Pub. Date: Mar. 12, 2009

(65) Prior Publication Data
US 2010/0205956 A1    Aug. 19, 2010

(30) Foreign Application Priority Data

Sep. 4, 2007  (NZ) .................................. 561186
Jul. 2, 2008  (NZ) .................................. 569588

(51) Int. Cl.
*F01B 29/10* (2006.01)
(52) U.S. Cl.
USPC .......................................................... 60/524
(58) Field of Classification Search
USPC ........................... 60/516–526, 616, 618, 620
See application file for complete search history.

(56) References Cited

U.S. PATENT DOCUMENTS

| 3,793,846 | A | | 2/1974 | Dehne |
| 3,827,238 | A | * | 8/1974 | Hayashi .......................... 60/286 |
| 4,020,645 | A | | 5/1977 | Pittatore |
| 4,394,351 | A | * | 7/1983 | Gast ............................. 422/171 |
| 4,667,474 | A | | 5/1987 | Koda et al. |
| 4,817,390 | A | | 4/1989 | Suganami et al. |
| 5,074,114 | A | | 12/1991 | Meijer et al. |
| 5,560,202 | A | * | 10/1996 | Hosoya et al. .................. 60/284 |
| 6,216,467 | B1 | | 4/2001 | O'Neil et al. |
| 6,595,007 | B2 | | 7/2003 | Amano |
| 2004/0265191 | A1 | * | 12/2004 | Tursky .......................... 422/179 |
| 2007/0017247 | A1 | * | 1/2007 | Pendray ......................... 62/501 |

FOREIGN PATENT DOCUMENTS

| GB | 2 219 384 A | 12/1989 |
| JP | 2001-124428 | 5/2001 |
| WO | WO 2007030021 A1 * | 3/2007 |

* cited by examiner

*Primary Examiner* — Kenneth Bomberg
*Assistant Examiner* — Jason Shanske
(74) *Attorney, Agent, or Firm* — Frommer Lawrence & Haug LLP; Ronald R Santucci

(57) ABSTRACT

An electrical power and heat co-generation unit typically comprising a Stirling engine includes an adsorption element within a sealed interior of the unit which is effective to remove from gas circulating within the interior of the machine hydrocarbons or other chemical species originating from within the interior of the machine from a grease, a lubricant, a retaining compound, or a sealant to reduce carburisation and/or oxidisation of internal components. The unit may also comprise within the sealed interior of the machine an atmosphere dosing fluid which is effective to react with hydrocarbons or other chemical species circulating in the interior of machine in addition to a working fluid of the machine, to produce reaction products which can be removed by the sorption element.

23 Claims, 2 Drawing Sheets

SEALED ENGINE/COMPRESSOR HOUSING COMPRISING AN ADSORPTION ELEMENT

This application is a 371 of PCT/NZ2008/000228 filed on Sep. 4, 2008, published on Mar. 12, 2009 under publication number WO 2009/031908 A and claims priority benefits of New Zealand Patent Application No. 561186 filed Sep. 4, 2007 and New Zealand Patent Application No. 569588 filed Jul. 2, 2008, the disclosures of which are hereby incorporated by reference.

FIELD OF THE INVENTION

The invention relates generally to a machine including a sorption element and an atmosphere dosing fluid, both within a sealed interior of the machine.

BACKGROUND TO THE INVENTION

Hermetically sealed machines, such as those found in micro combined heat and power (microCHP) units, often experience outgassing of unwanted hydrocarbons, other chemical species, and/or moisture, from components within the unit into the interior of the unit or machine casing at the high temperatures of operation. This can cause carburisation (carbon deposit and build up on) and/or oxidisation (corrosion) of the internal components, such as metal heat exchangers, of the machine. This can lead to power loss in the machine or complete failure of the machine.

It is an object of the present invention to provide an improved engine or at least to provide the public with a useful choice.

SUMMARY OF THE INVENTION

In a first aspect the invention broadly consists in an electrical power and heat co-generation machine comprising an external combustion engine, an electrical generator driven by the external combustion engine, means for extracting heat from exhaust gases from the engine and/or an engine coolant for supply to a thermal load, and including a sorption element within a sealed interior of the machine. The sorption element acts to remove unwanted hydrocarbons or other unwanted chemical species from gas circulating within the interior of the machine.

The external combustion engine may be a Stirling cycle engine, for example.

In one form the sorption element is contained within a hermetically sealed interior of the machine. In another form the sorption element is external to the machine but is connected to the hermetically sealed interior of the machine via a hermetically sealed gas flow path.

The sorption element acts to remove unwanted hydrocarbons or other unwanted chemical species from gas circulating within the interior of the machine. These species may evolve from greases, lubricants, retaining compounds, sealants, contaminants, residual cutting fluids or other compounds, within the hermetically sealed interior of the machine. Water can also be attached to or adsorbed into materials which can later be liberated into the gas.

In a preferred form the sorption material is a zeolite or other molecular sieve, or activated carbon, or a combination.

In a second aspect the invention broadly consists in a machine including a sealed interior comprising:
  a sorption element provided within the sealed interior and arranged to remove unwanted hydrocarbons or other unwanted chemical species in gas circulating within the interior of the machine; and
  an atmosphere dosing fluid introduced into the sealed interior to react with unwanted hydrocarbons or other unwanted chemical species from gas circulating within the interior of the machine.

Typically the machine is a closed cycle machine such as a Stirling or Brayton machine for example. The machine may be an external combustion engine such as a Stirling cycle engine, for example. The machine may be a Stirling cycle compressor, for example.

In one particular form of this second aspect, the invention comprises a Stirling machine including:
  an engine block having at least one cylinder and piston;
  a transmission for converting reciprocating movement of the piston to a rotary output or vice versa;
  a sorption element within the interior of the machine; and
  an atmosphere dosing fluid introduced into the sealed interior of the machine.

In one form the sorption element and atmosphere dosing fluid are contained within a hermetically sealed interior of the machine. In a second form, the sorption element is external to the machine but is connected to the hermetically sealed interior of the machine via a hermetically sealed gas flow path. In this second form, the atmosphere dosing fluid can flow between the hermetically sealed interior and the hermetically sealed sorption container via the gas flow path.

The sorption element acts to remove unwanted hydrocarbons or other unwanted chemical species from gas circulating within the interior of the machine, such as from greases, lubricants, retaining compounds, sealants, cutting fluids, cleaning fluids, adhesives, resins, elastomers or other plastics materials or contaminants or other compounds, within the hermetically sealed interior of the machine.

Where the unwanted gas cannot be adsorbed (e.g. methane or hydrogen) it may be reacted with the dosing fluid e.g. oxygen to create a compound that can be adsorbed (e.g. water).

The atmosphere dosing fluid reacts with unwanted hydrocarbons or other unwanted chemical species from gas circulating within the interior of the machines. Such hydrocarbons or chemical species may emerge from greases, lubricants, retaining compounds, sealants, contaminants, or other compounds, within the hermetically sealed interior of the machine. Typically, this reaction or combustion will have carbon dioxide and water as by-products. Typically, the sorption element acts to remove these by-products.

In a preferred form the sorption material is a zeolite or other molecular sieve, or activated carbon, or a hydrogen getter, or a combination.

In a preferred form, the atmosphere dosing fluid is a gaseous. More preferably, the dosing fluid is the gas Oxygen added to the working fluid of the machine (e.g. nitrogen, helium or argon or other inert gas).

In one form the machine also comprises an electrical generator. The machine may be a co-generation machine also comprising means for extracting heat from the engine coolant and/or exhaust gases for supply to a thermal load. The sorption element removes unwanted gaseous species from the encapsulation material of electrical windings of the generator. The atmosphere dosing fluid reacts with some of the unwanted gaseous species from the encapsulation material of electrical windings of the generator and produces byproducts which are retained by the sorption elements.

In a further aspect the invention comprises a method of reducing internal corrosion and/or carburisation in an electrical power and heat co-generation unit comprising a Stirling engine, an electrical generator driven by the engine, means for extracting heat from the engine coolant and/or exhaust gases for supply to a thermal load, which method comprises including a sorption element within a sealed interior of the unit or connected to the sealed interior of the unit via a hermetically sealed gas flow path, which is effective to remove from the interior of the machine hydrocarbons or other chemical species evolved into the interior of the machine from components or lubricants within the interior of the machine, and also comprises admitting into the sealed interior of the machine an atmosphere dosing fluid which is effective to react with such hydrocarbons or other chemical species to produce reaction products which can be removed by the sorption element.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

Figure 1:
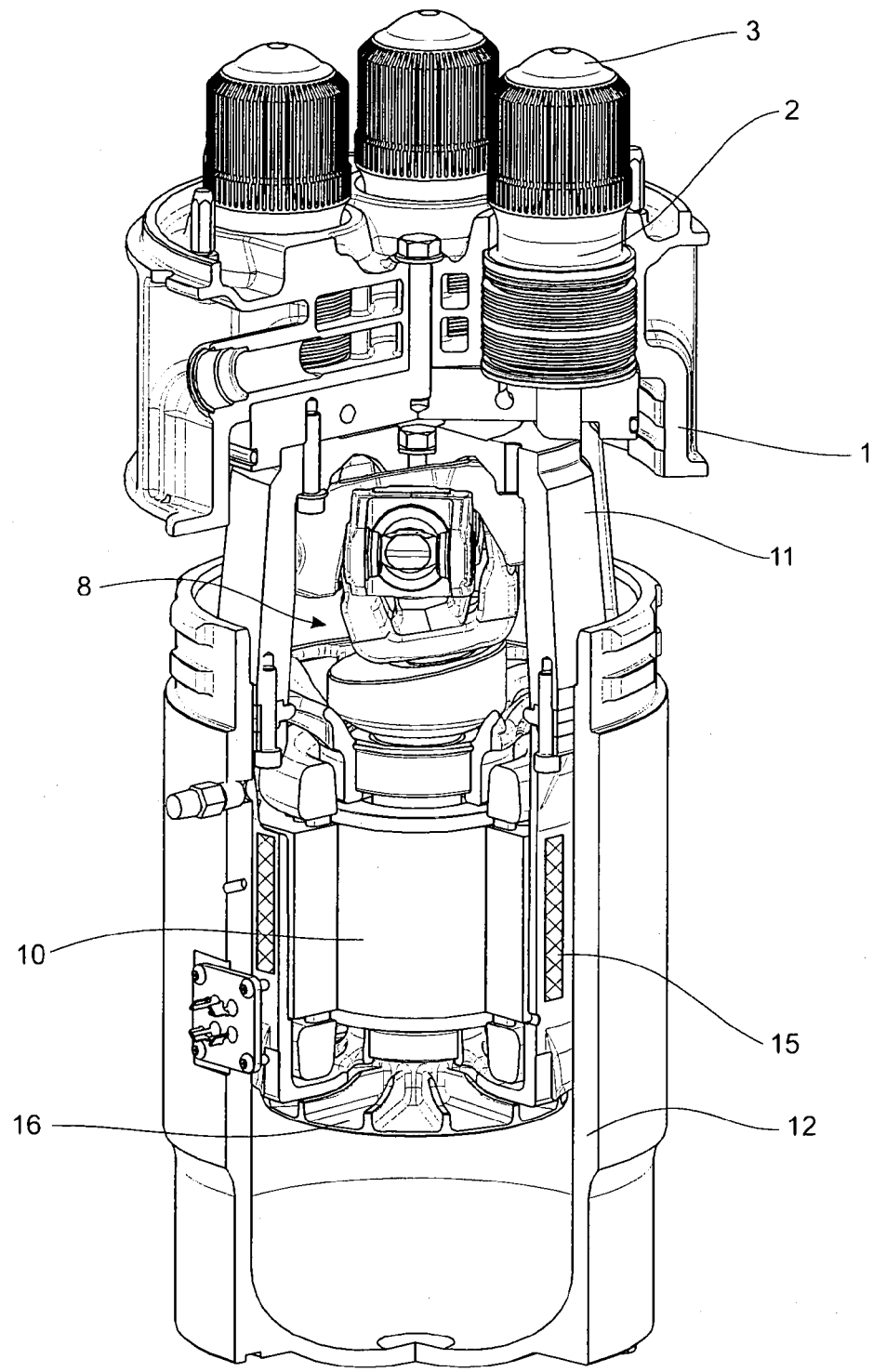
FIG. 1 is a partially cutaway view of a Stirling generation or co-generation unit of the invention, shown partially demounted.

The invention relates generally to a machine comprising a sorption element. The machine may also comprise an atmosphere dosing fluid in a sealed interior within the machine. The sorption element and atmosphere dosing fluid both assist with removal of unwanted hydrocarbons and other chemical species that can be introduced into the machine.

In the embodiment shown a Stirling engine of an electrical power generation unit or combined power and heat generation unit comprises an engine block and four coaxial cylinders 2 in which a working fluid is contained. Heater heads 3 extend from an upper side the block 1 into combustion chamber 4, each closing an upper end of a cylinder 2. Connecting rods 5, each connected to a piston 6 in a cylinder 2, pass through apertures 7 in a part of the engine block to the drive mechanism 8, which converts the reciprocating movement of the pistons to rotation of the output shaft 9, which drives electrical generator 10. The drive mechanism 8 may be a wobble-type crank, or swash plate drive mechanism, for example. The generator 10 is fixed by generator mount 11 to the engine block 1.

A pressure vessel 12 is fixed about its upper periphery to the engine block 1, and encloses and surrounds the drive mechanism 8 and the generator 10. The pressure vessel 12 hermetically seals the interior of the machine from the outside atmosphere.

Figure 2:
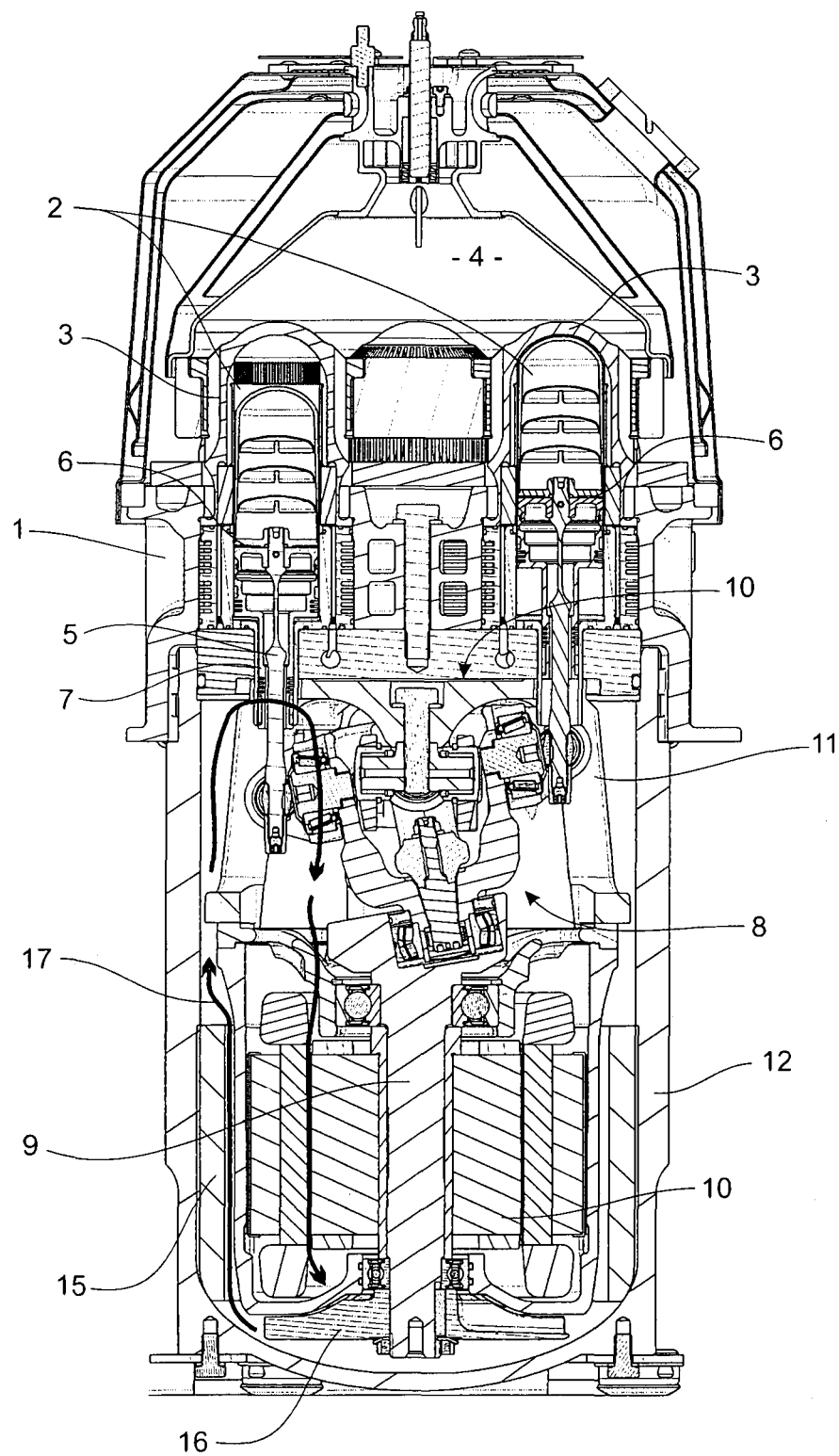
FIG. 2 is a longitudinal sectional view through the machine of FIG. 1.

The engine comprises a sorption element 15 within the interior of the machine, and in the embodiment shown, in an annular or cylindrical form within the space around the generator 10, between the generator 10 and the interior of the pressure vessel 12. Also mounted at the end of the generator 10 on the output shaft 10 is a fan 16 which circulates the working fluid within the pressure vessel 12, generally along path indicated by bold arrows 17 in FIG. 2, for cooling the drive mechanism 2. Flow from the fan 16 is deflected axially upward around the generator 10 by the concave inner surface at the lower end of the pressure vessel 12. The axial flow passes through the sorption element 15, is stopped by a transverse face, and the flow then extends radially inward and downward as indicated, through and about the components of the drive mechanism 8, before being drawn back through the generator 10 to the fan 16.

The sorption element may be in the form of a removable and replaceable cartridge of suitable dimensions and physical form, optionally contained within a holder fixed within the interior of the machine. The cartridge may comprise the sorption material in particulate form, within a woven or non-woven porous envelope which allows gas flow through the envelope. In a preferred form the woven material is coated with a polymeric material such as PTFE so that the coated envelope material provides micron level filtration to contain dust from the sorption material.

The sorption element may be replaced at intervals, at servicing of the machine, when for example the pressure vessel 12 is removed. The sorption element may in one embodiment also be replaceable through other component mounting apertures in the pressure vessel, without making removal of pressure vessel 12 necessary. Alternatively the sorption element may be provided within the interior of the machine for the operating life of the machine.

In another embodiment, one or more sorption element cartridges may also be mounted externally to the main housing with connecting conduits enabling passage of the housing gas flow through the sorption element/s. Preferably in this embodiment, sealed interior and connecting conduits are hermetically sealed against the outside atmosphere, while still allowing gas flow between the sealed interior and the sorption elements.

The engine may further comprise or have had an atmosphere dosing fluid introduced into the working fluid in the pressure vessel 12. The atmosphere dosing fluid may be introduced into the pressure vessel 4 through a valve. The atmosphere dosing fluid may be any suitable fluid but is preferably gaseous. More preferably, the atmosphere dosing fluid is or contains oxygen or air added to the machine working fluid (e.g. nitrogen helium or argon).

Common unwanted hydrocarbons and chemical species that can be found in a machine may include methane ($CH_4$), ethylene ($C_2H_4$), and hydrogen ($H_2$). The preferred form atmosphere dosing fluid can react or combust with such elements as shown in equation 1 below.

$$xCH_4 + yC_2H_4 + zH_2 + \left(2x + 3y + \frac{z}{2}\right)O_2 + rN_1 \Leftrightarrow \quad (1)$$
$$(x+2y)CO_2 + (2x+2y+z)H_2O + rN_2$$

The resulting carbon dioxide ($CO_2$) and water ($H_2O$) can then be absorbed or adsorbed by the sorption element.

The atmosphere dosing fluid moves with the working fluid. Fan 16 circulates the working fluid and the atmosphere dosing fluid within the pressure vessel 12, generally along path 17 for cooling the drive mechanism 8. Flow from the fan 16 is deflected axially upward around the generator by the concave inner surface at the lower end of the pressure vessel 12. The axial flow passes through the sorption element 15, is stopped by a transverse face, and the flow then extends radially inward and downward on path 17, through and about the components of the drive mechanism 8, before being drawn back throug the generator 10 to the fan 16. If connecting conduits are provided, flow from fan 16 may pass through these also.

The atmosphere dosing fluid may be topped up when required. Alternatively, the atmosphere dosing fluid may be provided within the interior of the machine for the operating life of the machine. If the sorption element is provided externally to the main housing with connecting conduits, the atmosphere dosing fluid will flow through the conduits so as to come into contact with the sorption element.

As an example of the application of the adsorber the following real machine test data is supplied.

Test 1

A new Stirling engine of a microCHP, filled with instrument grade nitrogen during manufacture as the working fluid and sealed, and then operated for approximately 1000 hours was found to internally accumulate gas species listed in Table 1 below in the column under "Without Adsorber". An identical engine containing an adsorber cartridge internally within the unit casing as described above, the adsorber cartridge comprising a combination of activated carbon and zeolite, was also operated for approximately 1000 hours. The gas within the interior of the unit was also analysed for presence of the same compounds and the results are given in Table 1 below in the column under "With Adsorber".

TABLE 1

| Compound | Unit | Without Adsorber | With Adsorber |
| --- | --- | --- | --- |
| Methane | ppm | 16000 | 350 |
| n-Butane | ppm | 45 | 0 |
| Ethylene | ppm | 1000 | 9 |
| Benzene | ppm | 460 | 0 |
| Toluene | ppm | 14 | 0 |
| Xylene | ppm | 1.8 | 0 |
| Methanol | ppm | 0.88 | 0 |
| Formaldehyde | ppm | 0.42 | 0 |
| Acetaldehyde | ppm | 4.3 | 0 |
| Acetone | ppm | 3.2 | 0 |
| Methyl ethyl ketone | ppm | 0.38 | 0 |

It is apparent that accumulation of these compounds was eliminated or substantially reduced.

Test 2

Similar comparative tests were carried out for the presence of hydrogen in similar new engines with a similar adsorber cartridge as described in Test 1 in one and without in another, after operation for about 500 hours. The results are given in Table 2 below.

TABLE 2

| Hydrogen PPM | |
| --- | --- |
| 1150 | With adsorber |
| 14063 | Without adsorber |

It is apparent that hydrogen accumulation was eliminated or substantially reduced.

Test 3

A similar new engine was heated and vacuumed and the sucked off gases passed through a liquid nitrogen cold trap. Approximately 5 grams of water was drawn off the internal components. After operation of another similar new engine with an adsorber cartridge as described above in Test 1 fitted the engine was also heated and vacuumed and the sucked off gases passed through a liquid nitrogen cold trap. Less than one gram of water was extracted. This demonstrates the adsorber dries the interior of the machine.

Test 4

On adding oxygen to the machine of Test 3 without an adsorber water condensation and corrosion occurred on the machine interior. Introducing an adsorber cartridge as described above in Test 1 to a similar machine and dosing the interior of the machine with oxygen resulted in the engine subsequently showing no signs of condensation and corrosion.

The foregoing description of the invention includes preferred forms thereof. Modifications may be made thereto without departing from the scope of the invention as defined in the accompanying claims.

The invention claimed is:

1. An electrical power and heat co-generation machine comprising
   an engine block;
   an external combustion engine disposed in the engine block,
   an electrical generator driven by the external combustion engine and mounted in a pressure vessel, the pressure vessel fixed to the engine block to provide an hermetic seal of the machine, and
   a sorption element within a sealed interior of the pressure vessel,
   wherein the sorption element is disposed within a space around the electrical generator and between the electrical generator and an interior wall of the pressure vessel and comprised of materials to remove hydrocarbons or other chemical species from gas circulating within the interior of the machine.

2. The machine according to claim 1 wherein the external combustion engine is a Stirling engine.

3. The machine according to claim 1 wherein the sorption element is effective to remove from gas circulating within the interior of the machine, hydrocarbons or other chemical species originating from any one or more of a grease, lubricant, retaining compound, sealant, cutting fluid, cleaning fluid, adhesive, resin, or an elastomer or other plastic material.

4. The machine according to claim 3 wherein the machine comprises a fan within the interior of the machine to assist circulation of gas within the pressure vessel through the sorption element.

5. The machine according to claim 4 wherein the sorption material is a zeolite or other molecular sieve, activated carbon, a hydrogen getter or a combination thereof.

6. The machine according to claim 4 wherein the sorption element is in the form of a cartridge which is removable from the interior and replaceable.

7. The machine according to claim 4 wherein the sorption element comprises a sorption material in particulate form contained within a gas permeable envelope.

8. The machine according to claim 1 also comprising within the pressure vessel an atmosphere dosing fluid to react with hydrocarbons or other chemical species from gas circulating within the pressure vessel.

9. The machine according to claim 8 wherein the atmosphere dosing fluid is effective to react with hydrocarbons or other chemical species in a working fluid circulating in the machine to produce reaction products which can be removed by the sorption element.

10. The machine according to claim 9 wherein said reaction products comprise carbon dioxide and water.

11. The machine according to claim 9 wherein the atmosphere dosing fluid will react with one or more of methane, ethylene, or hydrogen to produce carbon dioxide and water.

12. The machine according to claim 8 wherein the atmosphere dosing fluid is air or oxygen.

13. The machine according to claim 12 wherein the working fluid of the machine is an inert gas.

14. An electrical power and heat co-generation unit comprising
    a Stirling engine,
    an electrical generator driven by the engine, disposed in a pressure vessel and hermetically sealing the Stirling engine,
    an adsorption element disposed within a the pressure vessel or connected to the sealed interior of the unit via a hermetically sealed gas flow path, the adsorption element disposed within a space around the electrical generator and between the electrical generator and an interior wall of the pressure vessel and comprised of materials to remove from gas circulating within the interior of the unit hydrocarbons or other chemical species originating from within the interior of the unit from a grease, a lubricant, a retaining compound, or a sealant, and
    an atmosphere dosing fluid in the pressure vessel to react with hydrocarbons or other chemical species circulating in the interior of unit in addition to a working fluid of the unit, to produce reaction products which can be removed by the adsorption element.

15. The unit according to claim 14 wherein the adsorption element is effective to remove carbon dioxide and water.

16. The unit according to claim 14 wherein the adsorption element comprises a zeolite or other molecular sieve, activated carbon, or a combination thereof.

17. The unit according to claim 14 wherein the atmosphere dosing fluid comprises air or oxygen.

18. The unit according to claim 14 wherein the working fluid of the machine is an inert gas.

19. A method of reducing internal corrosion and/or carburisation in an electrical power and heat co-generation unit comprising a Stirling engine, an electrical generator driven by the engine disposed in a pressure vessel and hermetically sealing the Stirling engine, which method comprises:
    disposing an adsorption element within the pressure vessel of the unit or connected to the sealed interior of the unit via a hermetically sealed gas flow path, the adsorption element disposed within a space around the electrical generator and between the electrical generator and an interior wall of the pressure vessel and comprised of materials to remove hydrocarbons or other chemical species evolved into the interior of the unit from components or lubricants within the interior of the unit, and
    admitting into the pressure vessel of the unit an atmosphere dosing fluid which is effective to react with such hydrocarbons or other chemical species to produce reaction products which can be removed by the adsorption element.

20. The method according to claim 19 wherein the adsorption element is effective to remove carbon dioxide and water.

21. The method according to claim 20 wherein the atmosphere dosing fluid comprises air or oxygen.

22. The method according to claim 19 wherein the adsorption element comprises a zeolite or other molecular sieve, activated carbon, or a combination thereof.

23. An electrical power and heat co-generation machine comprising
    an engine block;
    an external combustion engine disposed in the engine block,
    an electrical generator driven by the external combustion engine and mounted in a pressure vessel, the pressure vessel fixed to the engine block to provide an hermetic seal of the machine, and
    a sorption element within a sealed interior of the pressure vessel connected to the sealed interior of the pressure vessel by an hermetically sealed gas flow path,
    wherein the sorption element is disposed within a space around the electrical generator and between the electrical generator and an interior wall of the pressure vessel and comprised of materials to remove hydrocarbons or other chemical species from gas circulating within the interior of the machine.

* * * * *